United States Patent [19]

Nagai

[11] Patent Number: 5,007,287
[45] Date of Patent: Apr. 16, 1991

[54] FILLER CAP OF JAR FOR WASHER
[75] Inventor: Kazuhiko Nagai, Yokohama, Japan
[73] Assignee: Jidosha Denki Kogyo K.K., Kanagawa, Japan
[21] Appl. No.: 440,172
[22] Filed: Nov. 22, 1989
[30] Foreign Application Priority Data
  Nov. 24, 1988 [JP] Japan .................. 63-153398[U]
[51] Int. Cl.⁵ .................. G01F 13/00; G01F 23/02
[52] U.S. Cl. .................. 73/290 B; 73/323; 73/864.01; 141/94; 215/310
[58] Field of Search .......... 73/290 R, 864.01, 864.02; 128/771

[56] References Cited
U.S. PATENT DOCUMENTS

| | | | |
|---|---|---|---|
| 1,385,270 | 7/1921 | Peterson | 73/864.01 |
| 3,500,689 | 3/1970 | Band | 73/864.01 |
| 4,210,156 | 7/1980 | Bennett | 73/864.01 |
| 4,410,020 | 10/1983 | Lorenz | 141/94 X |
| 4,830,213 | 5/1989 | Sleder | 220/367 X |

Primary Examiner—Daniel M. Yasich
Attorney, Agent, or Firm—Sughrue, Mion, Zinn, Macpeak & Seas

[57] ABSTRACT

A filler cap of a jar for a washer is provided with a stopper portion plugging filler hole of the jar, a pawl portion engaged with the filler hole and a tubular gauge for measuring residual quantity of detergent liquid in the jar which extends toward the bottom of the jar. The tubular guage communicates with an air hole in the cap opening on a finger gripped face of a knob provided on the stopper portion. In using this filler cap, it is possible to measure the residual quantity of the detergent liquid with ease and accuracy since gripping the knob to remove the stopper portion of the cap will also cover the air hole so as to retain a quantity of liquid in the guage indicative of the amount of fluid left in the jar.

1 Claim, 4 Drawing Sheets

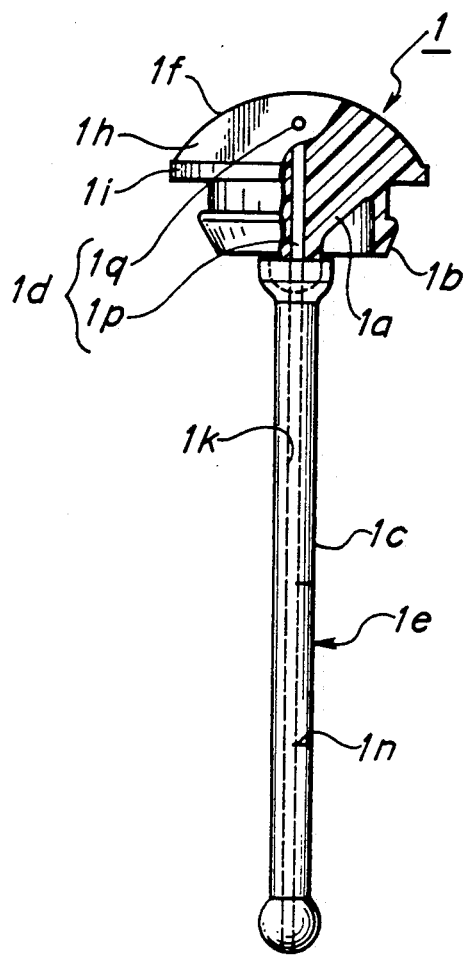
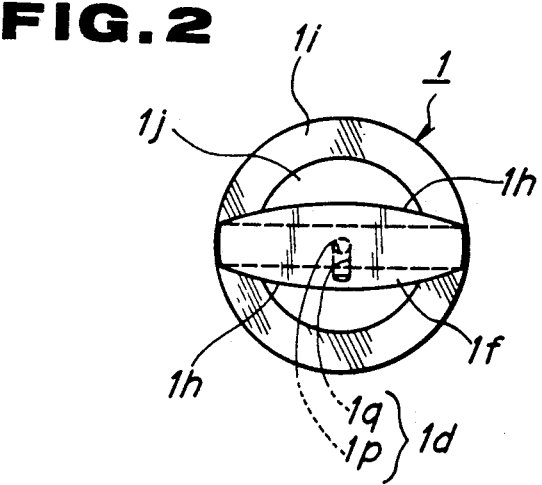

FILLER CAP OF JAR FOR WASHER

BACKGROUND OF THE INVENTION

1. Field of the Invention

This invention relates to a filler cap of a jar for cleaning a front windshield, a rear windshield, a headlight and the like which is taken off from a filler hole of the jar in case of pouring detergent liquid into the jar and is used for plugging the filler hole after finishing the pouring of the detergent liquid and, more particularly, to an filler cap having a gauge for measuring residual quantity of the detergent liquid.

2. Description of the Prior Art

Heretofore, there has been used a filler cap of a jar for a washer having a structure as shown in FIG. 4 to FIG. 7. One of the conventional filler caps is shown in FIG. 4 and FIG. 5, and another filler cap is shown in FIG. 6 and FIG. 7.

A filler cap 100 of a jar T for a washer shown in FIG. 4 and FIG. 5 is provided with an annular pawl portion 100b protruding in the inner peripheral direction and engaged with a filler hole 150b provided to the jar body 150a for storing detergent liquid and a tab on the outer periphery of a stopper portion 100a plugging the filler hole 150b and, is provided with an air hole 100c communicating straight into the internal part of the jar body 150a from an upper face 100a' on the upper side of the stopper portion 100a in FIG. 5.

Said air hole 100c is attached with a transparent tube 100e extending toward a bottom 150a' of the jar body 150a on the inside of the jar body 150a, and having an opening at the lower end and graduations 100d. A gauge 100f for measuring residual quantity of the detergent liquid is formed with said tube 100e and the air hole 100c.

In case of measuring the residual quantity of the detergent liquid using the gauge 100f, the pawl portion 100b of the filler cap 100 of the jar T is disengaged from the filler hole 150b of the jar body 150a fitted with the filler cap 100 of the jar T. Next, said filler cap 100 of the jar T is lifted up covering over the air hole 100c provided to the upper face 100a' of the stopper portion 100a with a finger, and the tube 100e is taken out from the jar body 150a. Thereby, the detergent liquid is maintained in the tube 100e at a position corresponding to a height of the detergent liquid in the jar body 150a. Therefore, residual quantity of the detergent liquid can be detected by measuring a height of the detergent liquid kept in the transparent tube 100e in contradistinction to the graduations 100d.

A filler cap 100 of a jar T for a washer shown in FIG. 6 and FIG. 7 is provided with an annular pawl portion 100b which protrudes in the outer direction and is engaged with a filler hole 150b provided to the jar body 150a for storing detergent liquid with the stopper portion 100a plugging the filler hole 150b and, with a half-disc shaped knob 100g extending upward from a nearly center part of the stopper portion 100a in FIG. 7, and is provided with an air hole 100c communicating straight on the internal part side of the jar body 150a from an upper face 100g' on the upper side of the knob 100g in FIG. 7.

Said air hole 100c is attached with a transparent tube 100e extending toward a bottom 150a' of the jar body 150a on the inside of the jar body 150a, and having an opening at the lower end and graduations 100d. A gauge 100f is formed with said tube 100e and the air hole 100c.

In this case, at the time of measuring the residual quantity of the detergent liquid using the gauge 100f, the pawl portion 100b is disengaged from the filler hole 150b of the jar body 150a fitted with the filler cap 100 of the jar T by holding the knob 100g of the filler cap 100 with fingers. Next, said filler cap 100 of the jar T is lifted up covering over the air hole 100c provided on the upper face 100g' of the knob 100g with a finger, and the tube 100e is taken out from the jar body 150a. Therefore, residual quantity of the detergent liquid can be detected by measuring an amount of the detergent liquid kept in the transparent tube 100e in contradistinction to the graduations 100d because the detergent liquid is maintained in the tube 100e by covering the air hole 100c with the finger.

However, in the conventional filler caps 100 of the jar T for the washer as described above, in case of measuring the residual quantity of the detergent liquid, the pawl portion 100b is first disengaged from the filler hole 150b of the jar body 150a, next the filler cap 100 is lifted up covering over the air hole 100c and, the amount of the detergent liquid remaining in the tube 100e is measured in contradistinction to the graduations 100d. Therefore, there is a problem in that it is troublesome to measure the residual quantity of the detergent liquid since the measuring work consists of an action of disengaging the pawl portion 100b and an action of lifting up the filler cap 100 while covering over the air hole 100c with a finger.

Additionally, concerning the air hole 100c, one type of the air hole, as shown in FIG. 4 and FIG. 5, communicated into the internal part of the jar body 150a from the upper face 100a' on the upper side of the stopper portion 100a in FIG. 5 and another type of the air hole, as shown in FIG. 6 and FIG. 7, communicated into the internal part of the jar body 150a from the upper face 100g' on the upper side of the knob 100g provided to the stopper portion 100a in FIG. 7 are adopted as the air hole 100c. However, it is difficult to cover the air hole 100c with a finger in either case, and it is impossible to maintain the detergent liquid in the tube 100e when the covering of the air hole 100c becomes loose. Therefore, there is another problem since it is not possible to measure the residual quantity of the detergent liquid accurately when the finger slips off the air hole 100c.

Consequently, it has been required to simplify the operation for measuring the residual quantity of the detergent liquid and to make it easy to cover the air hole.

SUMMARY OF THE INVENTION

Therefore, this invention is made in view of the above-mentioned problems of the prior art as a result of particular consideration of the structure with the object of providing a filler cap of a jar for a washer whenever it is possible to simplify the operation for measuring the residual quantity of detergent liquid and to measure the residual quantity of the detergent liquid with both ease and accuracy.

The construction of the filler cap of the jar for the washer according to this invention for attaining the above-mentioned object is characterized by having a stopper portion plugging a filler hole provided to the jar body for storing detergent liquid, a pawl portion possible to be engaged with said filler hole, and a tubular gauge for measuring residual quantity of the detergent liquid which extends into the internal part of the jar body from said stopper portion, said stopper portion being provided with a knob having a finger gripped face and an air hole communicating with said tubular gauge, and an opening of said air hole being disposed on said finger gripped face of the knob.

In the filler cap of the jar for the washer according to this invention, since the opening of the air hole is disposed on the finger gripped face of the knob provided to the stopper portion, the air hole is covered with the finger at the same time the pawl portion is disengaged from the filler hole by holding the knob between the fingers and lifting up the filler cap. Thereby, the operation for measuring the residual quantity of the detergent liquid is simplified and the finger never slips off the air hole.

BRIEF DESCRIPTION OF THE DRAWINGS

FIG. 1 is a partial sectional side view illustrating the filler cap of the jar for the washer according to an embodiment of this invention;

FIG. 2 is a top view of the filler cap of the jar for the washer shown in FIG. 1;

DESCRIPTION OF THE PREFERRED EMBODIMENT

Figure 3:
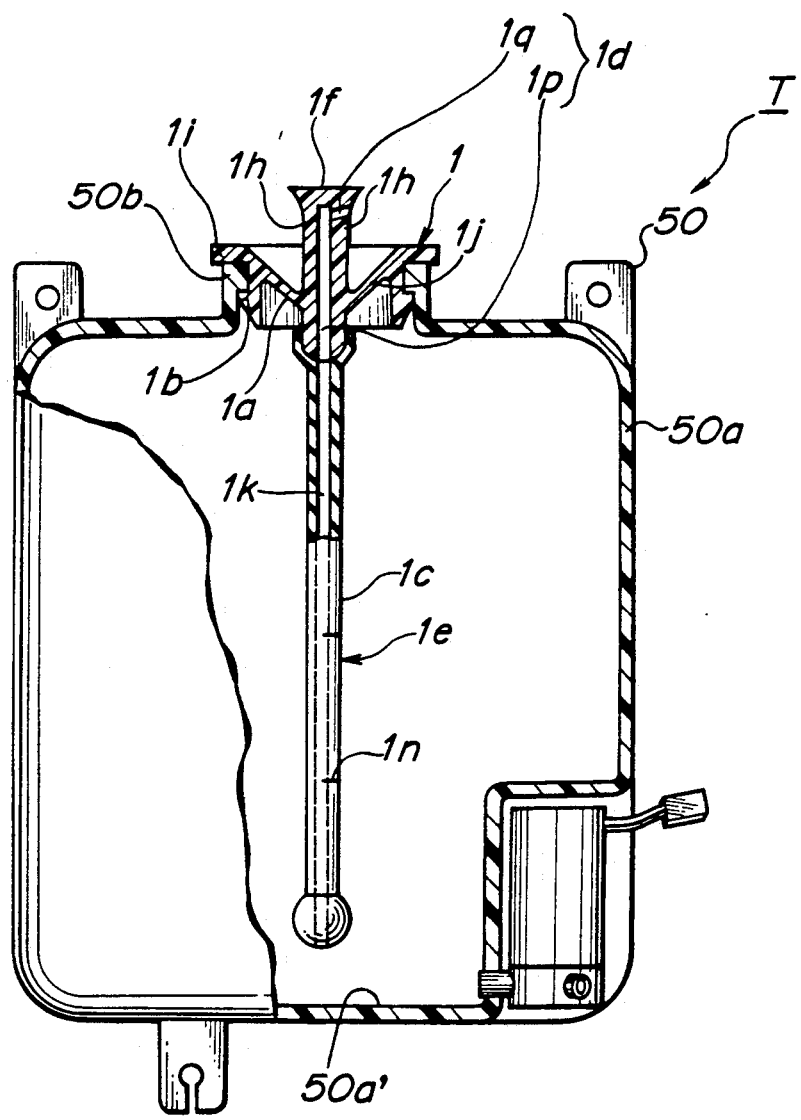
FIG. 3 is a partial sectional side view illustrating the fitted state of the filler cap of the jar for the washer shown in FIG. 1 into the jar body.
Figure 4:
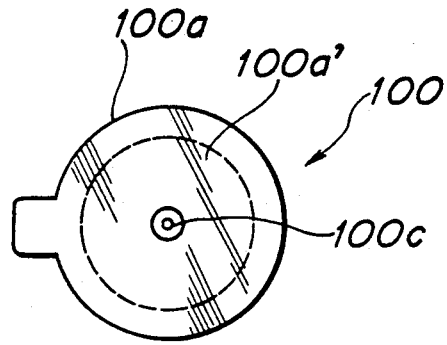
FIG. 4 is a top view of one of the conventional filler caps of the jar for the washer.
Figure 5:
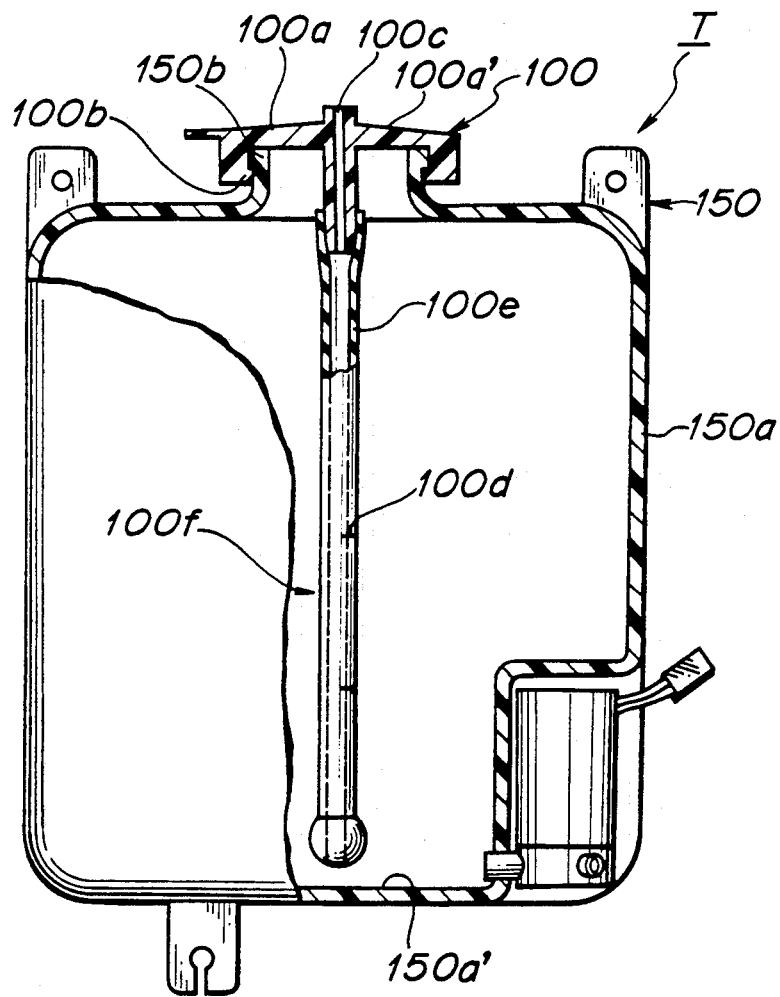
FIG. 5 is a partial sectional side view illustrating the fitted state of the filler cap of the jar for the washer shown in FIG. 4 onto the jar body.
Figure 6:
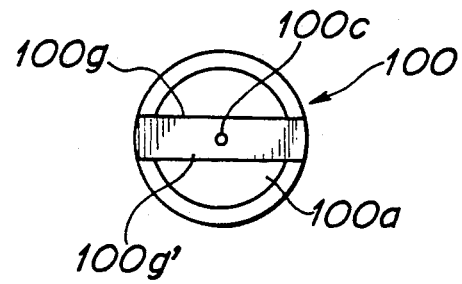
FIG. 6 is a top view of another one of the conventional filler caps of the jar for the washer.
Figure 7:
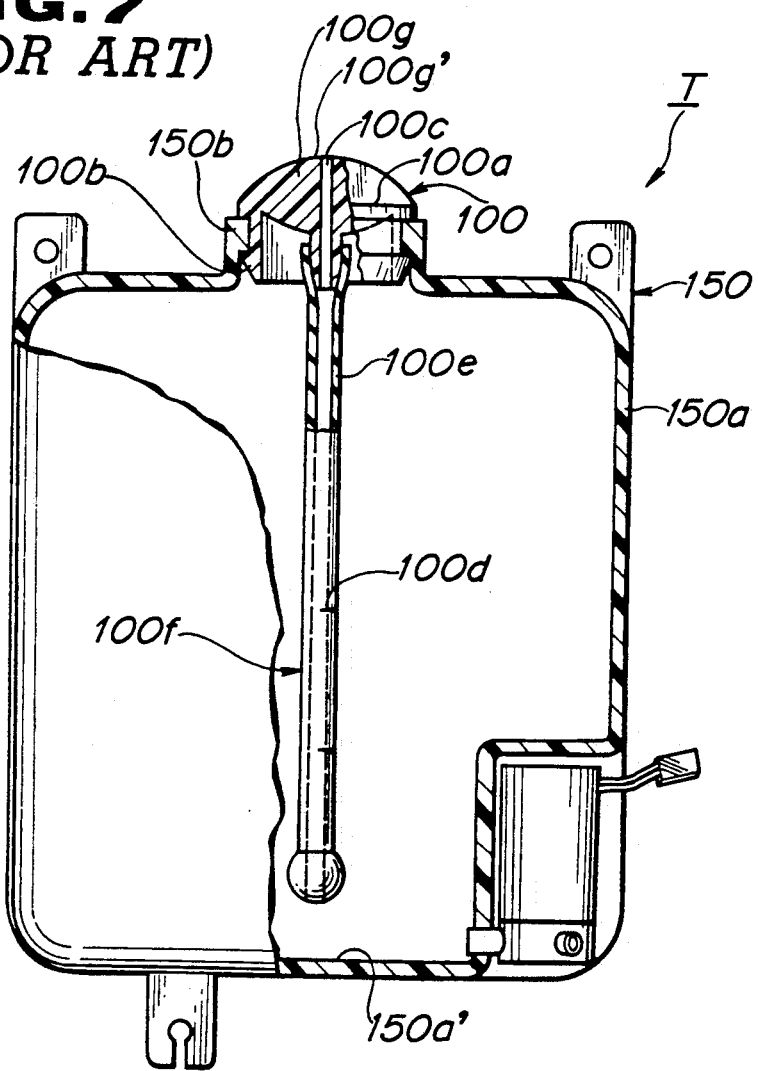
FIG. 7 is a partial sectional side view illustrating the fitted state of the filler cap of the jar for the washer shown in FIG. 6 into the jar body.

An embodiment of the filler cap of the jar for a washer according to an embodiment of this invention will be described below on basis of FIG. 1 to FIG. 3.

Namely, a filler cap 1 of a jar T for a washer is made of synthetic resin and is provided with a stopper portion 1a for plugging a filler hole 50b provided to a jar body 50a for storing detergent liquid, with a pawl portion 1b adapted to be engaged with said filler hole 50b, and with a tubular gauge 1e for measuring residual quantity of the detergent liquid which extends into the internal part of the jar 50a from said stopper portion 1a. The stopper portion 1a is provided with a knob 1f having a finger gripped face 1h and an air hole 1d commucating with said tubular gauge 1e, furthermore an opening of said air hole 1d is disposed on said finger gripped face 1h of the knob 1f.

The stopper portion 1a is, as shown in FIG. 3, provided on the inner peripheral side of the annular lip 1i with a conical concavity 1j. The outer diameter of said stopper portion 1a is formed larger than the inner diameter of the filler hole 50b provided to the jar body 50a, and the stopper portion is so formed as to plug said filler hole 50b.

Furthermore, said stopper portion 1a is provided with the knob 1f protruding upward in a half-disc shape from a position near to the lower end of said concavity 1j in FIG. 3 and having a width between the finger gripped faces 1h and 1h increasing toward the upper end.

Thus, said knob 1f is formed into a shape easy to be gripped with fingers because the knob 1f is so designed as to insert fingers into said concavity 1j easily, and so formed that the thickness increases toward the upper end in FIG. 3.

A pawl portion 1b extends downward in an annular shape from a position shifted a little toward the center part on the lip 1i of said stopper portion 1a in FIG. 3 and protrudes outward in a wedge-like shape so as to be engaged with the filler hole 50b provided to the jar body 50a.

A gauge 1e is formed with a tube 1c extending into the internal part of the jar body 50a from said stopper portion 1a and the air hole 1d communicates with said tube 1c (gauge 1e).

The tube 1c is made of transparent synthetic resin, has a hollow core 1k passing through to the both ends for introducing the detergent liquid from one end thereof and, has graduations 1n on the outer periphery. Said tube 1c has a length almost corresponding to the distance from said stopper portion 1a to the bottom 50a' of the jar body 50a at the state in which the filler cap 1 is fitted into the filler hole 50b provided to the jar body 50a.

Additionally, the air hole 1d comprises a main hole 1p passing through to the lower end from the position near to the upper end in FIG. 1 in the nearly center part of said knob 1f and communicating with the hollow core 1k of said tube 1c at the lower end thereof and, an auxiliary hole 1q communicating to the one side of finger gripped faces 1h of said knob 1f from the upper end of said main hole 1p in FIG. 1. The opening of said auxiliary hole 1q is disposed on nearly center part of the finger gripped face 1h.

In the case of measuring the residual quantity of the detergent liquid using the gauge 1e provided to the filler cap 1 of the jar T, the filler cap 1 is lifted upward in FIG. 3 after holding the finger gripped faces 1h and 1h of the knob 1f with fingers so as to cover the air hole 1d (the auxiliary hole 1q) opened in the center part on the one of finger gripped faces 1h of the knob 1f provided to the filler cap 1 in a state in which the filler cap 1 is fitted into the filler hole 50b provided to the jar body 50a stored with the detergent liquid. Thereby, the pawl portion 1b provided to the filler cap 1 is disengaged from said filler hole 50b and, the detergent liquid introduced in the hollow core 1k of the tube 1c is maintained in the tube 1c because the opening of the auxiliary hole 1q of the air hole 1d is covered with the finger. Therefore, the residual quantity of the detergent liquid can be detected by measuring an amount of the detergent liquid remaining in the tube 1c in contradistinction to the graduations 1n.

As mentioned above, the filler cap of the jar for the washer according to this invention has a stopper portion plugging a filler hole provided to the jar body for storing detergent liquid, a pawl portion adapted to be engaged with said filler hole, and a tubular gauge for measuring residual quantity of the detergent liquid which extends into the internal part of the jar body from said stopper portion, said stopper portion is provided with a knob having a finger gripped face and an air hole communicating with said tubular gauge, and an opening of said air hole is disposed on said finger gripped face of the knob. Therefore, it is possible to simplify the operation for measuring the residual quantity of the detergent liquid because it is possible to cover the air hole at the same time the pawl portion is disengaged from the filler hole by holding the knob with fingers and lifting up it from the jar body. Furthermore, since the opening of the air hole is disposed on the one of the finger gripped faces which is held with fingers in the case of lifting up the knob, the knob is so structured that the air hole is easy to be covered with a finger and the finger is difficult to slip off the air hole. Consequently, excellent effects are obtained since it is possible to measure the residual quantity of the detergent liquid with both ease and accuracy.

What is claimed is:

1. A filler cap for a washer jar adapted to hold a supply of detergent liquid comprising:

a stopper portion for plugging a filler hole provided in a top portion of the washer jar;

a transversely extending knob portion connected to and extending upwardly from said stopper portion and having an increasing thickness in the upward direction from the stopper portion to define a pair of finger gripping surfaces on opposite sides thereof;

a pawl portion disposed circumferentially about a lower end of said stopper portion for engagement with the filler hole;

an air hole extending through said stopper and having a first opening disposed on one of said finger gripping surfaces of said knob portion and a second opening in a bottom surface of said stopper portion; and a tubular gauge having a passage open at both ends thereof connected to said stopper portion with said passage in communication with said hole and adapted to extend into a bottom portion of the washer jar;

whereby upon gripping said plug portion and closing said first opening of said hole by means of a person's fingers and removing said stopper portion from said washer jar an amount of liquid will be retained in said passage of said tubular gauge indicative of the liquid level in the washer jar.

* * * * *